Sept. 4, 1934.  J. L. ANDERSON  1,972,509
METHOD OF WELDING SEAMS ALONG CURVING SURFACES
Filed Aug. 1, 1931  2 Sheets-Sheet 1
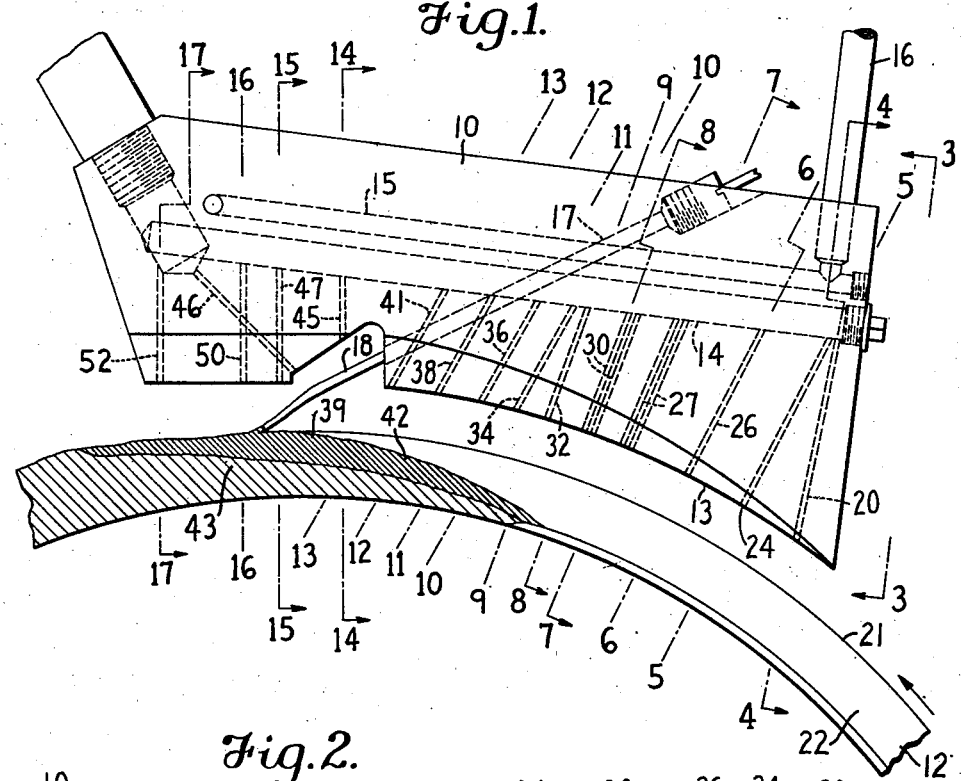
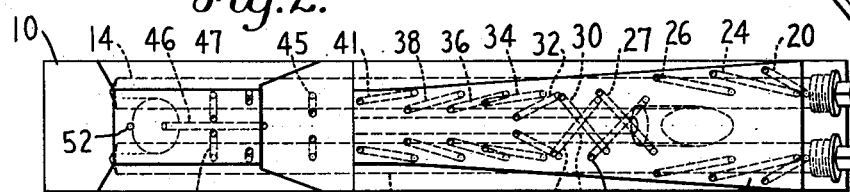
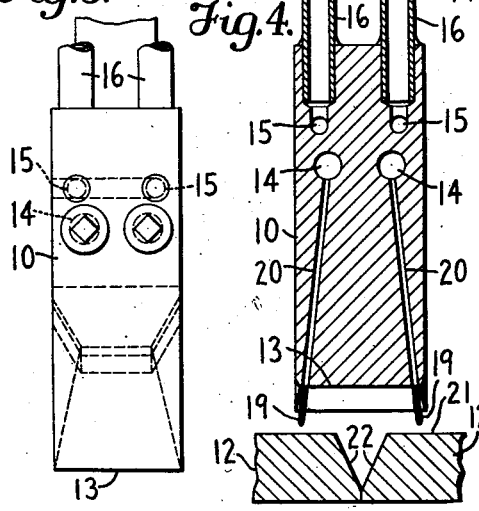
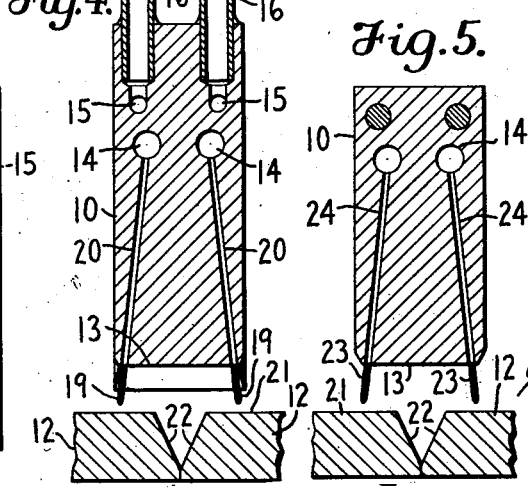
INVENTOR
James L. Anderson
BY
ATTORNEY Sept. 4, 1934.                    J. L. ANDERSON                    1,972,509
                METHOD OF WELDING SEAMS ALONG CURVING SURFACES
                    Filed Aug. 1, 1931        2 Sheets-Sheet 2
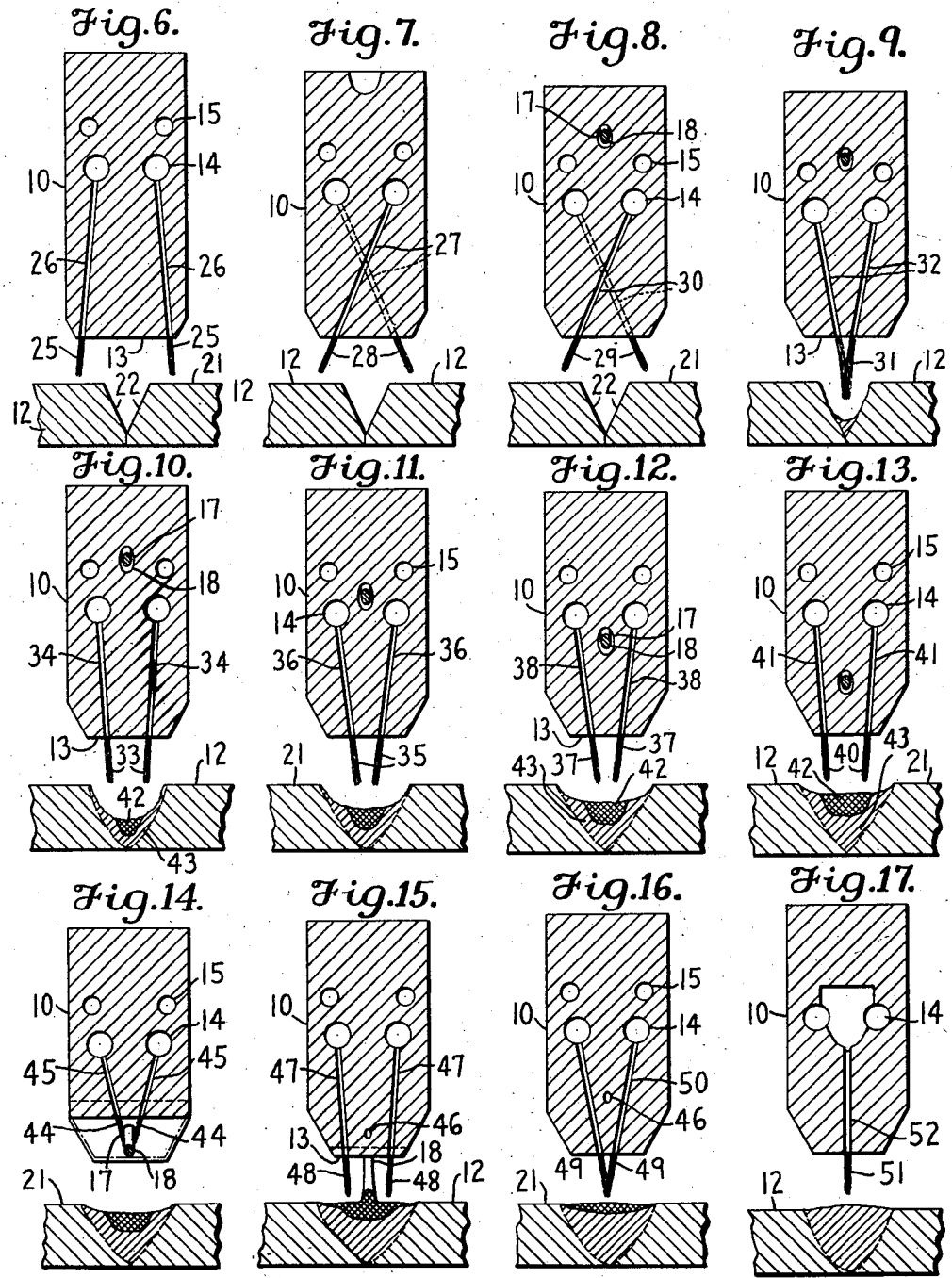

UNITED STATES PATENT OFFICE 1,972,509

METHOD OF WELDING SEAMS ALONG CURVING SURFACES

James L. Anderson, Tenafly, N. J., assignor to Air Reduction Company, Incorporated, New York, N. Y., a corporation of New York Application August 1, 1931, Serial No. 554,459

10 Claims. (Cl. 113—112)

Particular reference will be made to butt-welding opposed end edges of pipe or tubular sections, in the course of relative motion between such circumferential seam and a welding device, such as a multiple jet oxy-fuel gas torch tip. However, the invention also lends itself to welding sheet or plate metal parts generally along curving edges or portions thereof, when such curving edges or portions are substantially of the same curvature and may be brought into contiguous relation, either edge to edge, or overlapping, in accordance with particular features of the invention to be accomplished.

In work of this character, I have found it an advantage so to regulate the heating stages that the fused metal will have become plastic, or have congealed, in time to effect the weld approximately at the moment that the curving portions or edges at the seam have arrived at the crest of their movement, or slightly before, or slightly after, this particular time. In order to accomplish this the metal must be brought to fusion temperature before such time, and congelation must occur before the metal, in its fluid condition, passes so far beyond the crest that it would flow freely down the pipe walls. This gravitational tendency may be, and preferably is, taken advantage of to produce a weld of a desired fullness or contour.

I have also found, as set forth in my application Serial No. 527,033, filed April 1, 1931, that, in order to insure a weld of substantially homogeneous composition, in which the crystalline character of the metal does not vary at all abruptly, it is very advantageous that preheating of the metal occur at much greater distances from the seam edges than ordinarily are thought advisable merely to bring the seam metal to fusion. The results flowing from such preheating include the substantial absence of any demarkation between metal which has, and metal which has not, been molten during the fusing step. To assist in this, I have found it desirable to cut down by melting the ordinary straight-faced trough formed by the beveled edges to form a rounded trough. It has also been found desirable, for many reasons, to reproduce in mechanical welding operations of this character certain of the effects of the manipulations effected by the welder using a hand torch.

It is an object of the invention to provide a method of welding, whereby welding temperatures are created along seams at the abutted end edges of pipe or tube members while such seams are moved past a torch tip at predetermined speeds, in a manner which produces substantially all the desirable results flowing from manipulation of the heating jet in a manual operation while making possible the building up of large heated areas both in advance of and laterally spaced away from the point or position at which fusion is to be effected. I prefer to carry out the method of this invention with a tip such as disclosed in my application Serial No. 495,920, filed November 15, 1930. Such a tip is designed to conform closely to the contour of the seam or similar element or elements to be operated upon to secure the maximum efficiency from the heating effects of the flame jets.

The formation of the face of the tip and the orifice drilling are such that the jets issuing from the orifices, or certain of them, will act to force their heated gases forwardly along the seam, and beyond the body of the tip to increase the effective distance of preheating without increase in tip length. Other orifices are disposed to direct their jets so as to concentrate their heating effect at the position where fusion is finally to take place. Such jets also function to force any molten metal that may form to travel along the seam in the direction of the jets. Since it is proposed to effect melting of metal on an upwardly traveling portion of the seam, such propulsion of the metal will tend to drive it to the crest of movement, there to take part in the final production of the weld. The jets are also arranged in such consecutive relation that the molten metal formed will be driven along the seam until it arrives at a predetermined position at which the jets will produce the effect of hand manipulation, spreading the metal laterally to give to the weld a finally desired flat, smooth finish.

The drilling of the orifices is also such that some of the jets will impinge directly upon metal widely removed laterally from the seam. A broad zone of hot metal will thus be erected, and conduction from the very hot molten metal to the comparatively very cold body metal will be reduced to a minimum.

Other objects of this invention will be set forth in or will be apparent from the description and the drawings, in which is illustrated an embodiment of the apparatus for carrying out the invention. The invention, however, is not intended to be restricted to the welding by means of the torch illustrated, or to the specific details of the method, which are described, as the same may be modified in various particulars or be applied in somewhat varied relations.

In the drawings:

Fig. 1 is a vertical elevational view of a torch tip, embodying the invention, a portion of one of two pipe ends being welded being shown in elevation and the weld in section;

Fig. 2 is a bottom plan view of the tip shown in Fig. 1;

Fig. 3 is an end elevational view of a tip as seen from the line 3—3 of Fig. 1; and Figs. 4 to 17, inclusive, are vertical transverse sectional views on the lines 4—4 to 17—17, inclusive, respectively, of Fig. 1.

In Fig. 1, the tip 10 is shown disposed above the end of a pipe section 12, the opposed pipe section not appearing in this view. Portions of the two pipe sections, both marked 12, are shown in Figs. 6-7. The unwelded seam is of the trough type, formed by bevel faces, at the bottom of which are small vertical faces. The orifice face 13 of the tip, at least in part, follows closely the contour of the seam and in this instance the circumferential contour of the pipe sections. It is customary that the tip remain stationary, while the sections, preliminarily tacked, together rotate past the jets issuing from the tip.

In the body of the tip are longitudinal header passages 14, from which the orifices in the face 13 are to be fed a mixture of oxygen and acetylene. Another pair of passages 15 provide means for conducting cooling water supplied by conduits 16 through the body. A diagonal duct 17 is formed through the body to conduct a wire 18 to supply added metal to be melted into the seam.

It will be necessary to consider each individual flame jet orifice or pairs of orifices, since the functions of the jets differ. As shown in Fig. 4, the jets 19, issuing from the laterally divergent orifices 20, at the forward end of the torch are disposed to attack the metal of the pipe sections at a considerable distance away from the junction edge of the surface 21 of the section and the beveled face 22.

These jets meet surface 21 at an angle, directed outwardly, so that the hot gases of the jets will be swept over the surface away from the seam and will heat the parts widely. The jets are located immediately above the upwardly moving portion of the seam and at a substantial distance below the crest of movement. Their angle of incidence upon surface 21 results in a flow of the hot gases downwardly along the curving section wall faces, increasing the amount of metal preheated. By thus increasing the distance at which preheat of the metal is effective, the length of tip 10 is kept within reasonable bounds while a large portion of the surface and the underlying metal are heated to some semblance of uniformity, which, in addition to its heat value, also reduces expansive and contractive effects upon the seam.

Jets 23 issuing from orifices 24 have substantially the same outward angular disposition as jets 20, but as shown in Fig. 1 these orifices are inclined longitudinally away from the orifices 20, so that the jets 23 are directed more nearly in a radial plane. Jets 25 from orifices 26 are disposed substantially in the same manner as jets 23, except that they have slightly less of the outward tendency. Jets 23 and 25, aided by the preliminary action of jets 19, increase the heat in the metal adjacent the seam edges 22.

Orifices 27 which deliver jets 28 are disposed in crossed relation to each other to drive the jet gases outwardly away from the seam. By disposing these jets in this manner, the sides of the jets are opposed to the face of the metal, so that, in addition to the heat absorbed by direct contact of the hot gases with the metal, the path of radiant heat from the jets to the faces is shortened.

This is also the case with the jets 29 which issue from crossing orifices 30. The disposition of these jets and orifices is substantially the same as that of jets 28 and orifices 27, except that the points of impingement upon the surface are closer to the junction edges of the seam. These jets constitute the last units in the preheating system for bringing the metal to fusing temperature.

Jets 31 issuing from orifices 32 constitute the first set of active means intended to fuse metal. These jets are disposed to strike directly in the trough between the sections. By the time these jets become effective, the temperature of the metal will have become such that a breakdown or melting of the trough faces will commence, so that when these faces pass on to the action of jets 33 issuing from orifices 34 considerable melting will be in progress.

As seen in Figs. 9 and 10, the relative angular disposition within each group of jets 31 and 32 is different, jets 32 being more nearly parallel than jets 31, and the separation of the jets 32 consequently being materially greater so that the heating effect is moved upwardly and outwardly from the bottom of the trough to break down the upper portions of the walls of the V. The effect of the jets 31 is very useful, since melting metal at the bottom of the groove is more difficult than other portions of the weld to be produced. These jets and the subsequent jets produce the desired rounding of the trough.

The succeeding pairs of jets 35 and 37 delivered from orifices 36 and 38 are converged again toward the bottom of the groove. These jets serve to keep molten such metal as has already been melted and has collected in the bottom of the groove. Their deflected gases and their radiant heat also melt down more of the metal of the sides of the trough.

It is also to be noted that jets 33, 35, and 37 are disposed to direct their gases in the direction in which the seam is moving past tip 10. The metal melted by these jets will, by the pressure of the gases, be forced to move forwardly along the seam and be retained against moving backward down the incline of the pipe walls. As the seam moves toward the crest of its rotation, such metal will be driven into the puddle 39, forming just beyond these jets.

Jets 40 issuing from orifices 41 continue the work of jets 35 and 37, their inward inclination being less so that they attack the metal further removed from the center of the seam than do jets 35 and 37. This changing of the relative positions of impingement of the several jets with relation to the center line of the seam results in a movement of the molten metal and a heating of the general mass of metal in a manner similar to that accomplished by one manipulating a hand torch, proper melting of the sides of the groove, as well as fusion at the bottom of the groove, being produced.

As illustrated in Figs. 10, 11, 12 and 13, during the action of the respective jets, while the puddle of molten metal 42 is retained in position by the jets, metal 43 is continuously solidifying to build up the final welded joint. To make up for metal loss and build up the weld, wire 18 is fed through duct 17. To bring this wire to melting temperature before it contacts with the molten metal at the seam, and simultaneously to assist in retaining the molten metal at the seam in fused condition, is the purpose of jets 44 delivered by orifices 45. As shown in Fig. 14, these jets impinge upon and "wipe" the side faces of the wire, so that it will be subjected to the direct and radiant heat of both jets. At the same time, owing to the sharp convergence of these jets, they affect the molten metal in the seam groove by spreading their heat laterally to insure wider distribution of heat and some spreading of the molten metal at the time the wire metal is being introduced. A single jet, directed from orifice 46 and rearwardly of the movement of the pipe, acts directly upon the wire to cut the same and melt it down into the seam.

At the next set of orifices 47 the direction of jets 48 changes from the extreme convergence of jets 44, and the jets 48 act directly upon the molten metal in the seam, their effect by their transverse spacing being to assist in the complete interfusion of the wire metal with the rest of the metal in the groove. These jets are disposed practically in a radial plane, so that little or no unbalanced longitudinal disturbance of the molten metal will occur. These jets are intended to attack the molten metal immediately at, just before, or just after the crest of movement of the seam edges. The determining factors in this case would arise with each separate situation, suitable adjusting means for positioning the torch tip as a unit being provided. Among these factors are the relative speed of movement of the seam past the tip, the number of jets utilized to bring the metal to fusion before this position, and the thickness of the pipe walls.

Since, as is well known, the action of the flame jets has been to force the metal into a ridge or hump, which, in many cases, is undesirable, jets 49 are directed from orifices 50 and, as seen in Fig. 16, act against each other, so that as they impinge directly upon the central ridge built up by the previous jets they will tend to spread such metal outwardly, thus in effect flattening the metal to produce the smooth formation shown in Fig. 17. The fillets between the melted and the unmelted metal are gradual, so that the weld does not suffer from sharp corners or other weakening influences. Also, these jets retain the metal in molten condition for a sufficient period, so that the puddle 42 extends slightly beyond the crest of movement onto the downgoing side of the pipe, so that by proper regulation of speed and the position of the tip relative to the crest the fullness of the finally solidified metal will be predetermined.

The spacing between jets 49 and the final single jet 51 from orifice 52 is such that the molten metal will have had the opportunity to congeal practically entirely, the effect of jet 51 being to delay the complete cooling and rigidification of the metal, so that slower crystallization will result, with consequent finer crystals and greater strength in metal. Also, this jet will tend to effect a spreading of any metal which may still remain in a molten or plastic condition.

What is claimed as new is:

1. A method of welding together pipe sections at their end edges, which comprises: effecting continuous relative rotational movement of the end edges and of a torch having a succession of flame jets, positioned substantially at and adjacent the upper crest of the movement of said sections, directing one or more of the flame jets from the forward portion of the torch in a direction to cause the hot gases to flow along the walls adjacent the edges of the sections oppositely to the direction of movement of the edges relative to the torch to preheat the metal ahead of the torch, and directing one or more of the flame jets from the rearward portion of the torch in a direction diverging from that of the preheating jet or jets to cause the hot gases to flow upwardly along the pipe walls and outwardly away from the seam.

2. A method of welding together pipe sections, positioned in end to end relationship to provide a seam groove, which comprises: effecting continuous relative rotational movement of the sections and of a torch having a succession of flame jets, positioned substantially at and adjacent the upper crest of the movement of said sections, initially directing the hot gases at the pipe sections adjacent the seam and oppositely to the direction of movement of the sections relative to the torch and down along the walls of the sections, thereafter directing the hot gases upwardly along the pipe wall and outwardly away from the seam, and then down into the groove of the seam.

3. A method of welding together pipe sections positioned in end to end relationship and being formed to provide a seam groove, which comprises: effecting continuous relative rotational movement of the sections and of a succession of flame jets positioned substantially at and adjacent the upper crest of the movement of said sections, initially directing the hot gases at the metal adjacent the seam groove and oppositely to the direction of movement of the sections relative to the source of flame jets, and down along the walls of the sections, thereafter directing the hot gases upwardly along the pipe wall, and first outwardly away from the seam, and then down into the groove of the seam, and then melting metal off the upper faces of the seam margins to widen the cut of the groove.

4. A method of welding together pipe sections positioned in end to end relationship to provide a seam groove, which comprises: effecting relative rotational movement of the sections and of a succession of flame jets positioned substantially at and adjacent the upper crest of the movement of said sections, directing the hot gases at the seam between adjacent sections upwardly along the pipe wall to melt metal off the faces of the seam margins, and pushing metal thus melted up the incline of the pipe surface.

5. A method of welding together pipe sections positioned in end to end relationship to provide a seam groove, which comprises: effecting relative rotational movement of the sections and of a succession of flame jets positioned substantially at and adjacent the upper crest of the movement of said sections, directing the hot gases upwardly along the pipe wall to melt metal off the faces of the seam margins to widen the cut of the groove while maintaining the bottom of the groove heated to melting temperature, and melting additional metal into the molten metal at the groove.

6. A method of progressively welding together pairs of metallic pipe sections positioned substantially in end to end abutting relation, the ends of the sections being prepared so that when substantially abutted the seam formed will include a groove opening outwardly from the pipe walls, which includes the steps of: subjecting the groove walls to the action of high temperature flame jets to melt the lower portion of the groove, then melting the upper portions of the groove walls, adding heat to the molten metal at the bottom of the groove, melting the junction of the groove and the surfaces of the sections, and simultaneously melting metal from an external source into the molten metal within the groove and subjecting the molten metal at the bottom of the groove to the action of the jets.

7. A method of progressively welding together pairs of metallic pipe sections positioned substantially in end to end abutting relation, the ends of the sections being prepared so that when substantially abutted the seam formed will include a groove opening outwardly from the pipe walls, which includes the steps of: subjecting the groove walls to the action of high temperature flame jets to melt the groove walls and melt the junction of the groove and the surfaces of the sections, melting metal from an external source into the molten metal within the groove, interfusing the molten metallic portions, and then forcing the metal outwardly by the pressure of the jets.

8. A method of progressively welding together pairs of metallic pipe sections positioned substantially in end to end abutting relation, the ends of the sections being prepared so that when substantially abutted the seam formed will include a groove opening outwardly from the pipe walls, which includes the steps of: subjecting the sections in close proximity to the ends to be welded to one or more high temperature flame jets to heat the metal at the section ends, subjecting the groove walls to the action of a jet or jets, and melting down the groove walls immediately along the inner faces thereof, the action of the jet or jets being such as to propel the molten metal upwardly along the groove.

9. A method of welding together pairs of metallic pipe sections positioned in end to end abutting relation, the ends of the sections being prepared so that when substantially abutted the seam formed will include a groove opening outwardly from the pipe walls, which includes the steps of: subjecting the groove walls to the action of a high temperature source to melt down the groove walls, melting the junction of the groove and the surfaces of the sections, and melting metal from an external source into the molten metal within the groove, the action of the jet or jets being such as to propel the molten metal upwardly along the groove in advance of the position at which it is melted.

10. A process of welding together two members along portions thereof, positioned substantially in contacting relationship, and along curving surfaces thereof, the contiguous portions being formed to provide a substantial groove, the metal of the contiguous portions being brought to fusion temperature and permitted to combine while substantially in molten condition and before any marked rigidification has ensued, which comprises: effecting relative movement of the contiguous portions past a plurality of relatively fixed high temperature flame jets with the successive jets directed to strike the metal at different positions transversely of the groove so that the heat is applied to the metal as by moving a single jet transversely of the groove as the groove moves longitudinally with respect to the jet, and the jets being directed to move metal, molten in the groove, along the groove toward the crest of the curving surfaces.

JAMES L. ANDERSON.